United States Patent
Kurian

(10) Patent No.: US 10,460,367 B2
(45) Date of Patent: Oct. 29, 2019

(54) SYSTEM FOR USER AUTHENTICATION BASED ON LINKING A RANDOMLY GENERATED NUMBER TO THE USER AND A PHYSICAL ITEM

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 670 days.

(21) Appl. No.: 15/142,931

(22) Filed: Apr. 29, 2016

(65) Prior Publication Data

US 2017/0316479 A1  Nov. 2, 2017

(51) Int. Cl.
| | |
|---|---|
| G06Q 30/00 | (2012.01) |
| G06Q 30/06 | (2012.01) |
| G06Q 10/08 | (2012.01) |
| G06Q 20/40 | (2012.01) |
| G06F 7/58 | (2006.01) |
| G06F 16/9535 | (2019.01) |
| G06Q 20/32 | (2012.01) |
| G06Q 20/38 | (2012.01) |

(52) U.S. Cl.
CPC ......... *G06Q 30/0609* (2013.01); *G06F 7/582* (2013.01); *G06F 16/9535* (2019.01); *G06Q 10/0833* (2013.01); *G06Q 20/32* (2013.01); *G06Q 20/385* (2013.01); *G06Q 20/401* (2013.01); *G06Q 30/018* (2013.01)

(58) Field of Classification Search
CPC .................................................. G06Q 30/00
See application file for complete search history.

(56) References Cited

U.S. PATENT DOCUMENTS

| | | |
|---|---|---|
| 3,119,103 A | 1/1964 | Fertig |
| 3,245,915 A | 4/1966 | Rai et al. |
| 3,254,000 A | 5/1966 | Chibret |
| 3,256,670 A | 6/1966 | Tersigni |

(Continued)

FOREIGN PATENT DOCUMENTS

| | | |
|---|---|---|
| CN | 101599151 A | 12/2009 |
| EP | 1132876 A2 | 9/2001 |

(Continued)

OTHER PUBLICATIONS

Anonymous, "Payment Tokenization Explained", Squareup.com, dated Apr. 26, 2016 (Year: 2016).*

(Continued)

*Primary Examiner* — Mark A Fadok
(74) *Attorney, Agent, or Firm* — Michael A. Springs; Moore & Van Allen PLLC; James C. Edwards

(57) ABSTRACT

A system for authenticating recipients of a physical item based on generating a random number and linking the random number to the physical item and the intended recipient. Once the intended recipient is in possession of the physical item and the generated random number, the intended recipient is authorized for the purpose of using/processing the physical item by presenting the random number for recipient authentication. In other specific embodiments of the invention, the physical item is generated with the random number included in place of personal information associated with the provider.

13 Claims, 5 Drawing Sheets

(56) References Cited

U.S. PATENT DOCUMENTS

| | | | |
|---|---|---|---|
| 3,330,546 A | 7/1967 | Bryan | |
| 3,422,462 A | 1/1969 | Finnieston | |
| 3,516,056 A | 6/1970 | Matthews | |
| 3,651,168 A | 3/1972 | Stoessel et al. | |
| 3,658,393 A | 4/1972 | Luthi | |
| 3,718,328 A | 2/1973 | Comstock | |
| 3,748,367 A | 7/1973 | Lamme et al. | |
| 4,630,201 A * | 12/1986 | White | G06Q 20/04 235/379 |
| 4,766,293 A | 8/1988 | Boston | |
| 5,438,186 A | 8/1995 | Nair et al. | |
| 5,589,271 A | 12/1996 | Watanabe et al. | |
| 5,770,533 A * | 6/1998 | Franchi | G07F 17/0014 463/16 |
| 5,781,654 A | 7/1998 | Carney | |
| 5,884,289 A | 3/1999 | Anderson et al. | |
| 5,892,900 A | 4/1999 | Ginter et al. | |
| 5,949,044 A | 9/1999 | Walker et al. | |
| 6,119,103 A | 9/2000 | Basch et al. | |
| 6,236,981 B1 | 5/2001 | Hill | |
| 6,254,000 B1 | 7/2001 | Degen et al. | |
| 6,256,670 B1 | 7/2001 | Davies | |
| 6,330,546 B1 | 12/2001 | Gopinathan et al. | |
| 6,341,353 B1 | 1/2002 | Herman et al. | |
| 6,422,462 B1 | 7/2002 | Cohen | |
| 6,487,540 B1 | 11/2002 | Smith et al. | |
| 6,516,056 B1 | 2/2003 | Justice et al. | |
| 6,536,659 B1 | 3/2003 | Hauser et al. | |
| 6,609,654 B1 * | 8/2003 | Anderson | G06K 19/06196 235/379 |
| 6,651,168 B1 | 11/2003 | Kao et al. | |
| 6,658,393 B1 | 12/2003 | Basch et al. | |
| 6,718,328 B1 | 4/2004 | Norris | |
| 6,748,366 B1 * | 6/2004 | Hurwitz | G06Q 20/02 235/380 |
| 6,748,367 B1 | 6/2004 | Lee | |
| 6,748,533 B1 | 6/2004 | Wu et al. | |
| 6,913,194 B2 | 7/2005 | Suzuki | |
| 6,999,943 B1 | 2/2006 | Johnson et al. | |
| 7,031,945 B1 | 4/2006 | Donner | |
| 7,058,806 B2 | 6/2006 | Smeets et al. | |
| 7,082,406 B1 | 7/2006 | Dickson | |
| 7,103,576 B2 | 9/2006 | Mann, III et al. | |
| 7,111,323 B1 | 9/2006 | Bhatia et al. | |
| 7,114,079 B1 | 9/2006 | Cook et al. | |
| 7,136,835 B1 | 11/2006 | Flitcroft et al. | |
| 7,177,838 B1 | 2/2007 | Ling | |
| 7,328,189 B2 | 2/2008 | Ling | |
| 7,337,144 B1 | 2/2008 | Blinn et al. | |
| 7,398,250 B2 | 7/2008 | Blinn et al. | |
| 7,406,434 B1 | 7/2008 | Chang et al. | |
| 7,487,912 B2 | 2/2009 | Seifert et al. | |
| 7,596,516 B2 | 9/2009 | Starkowsky et al. | |
| 7,596,530 B1 | 9/2009 | Glasberg | |
| 7,606,560 B2 | 10/2009 | Labrou et al. | |
| 7,610,040 B2 | 10/2009 | Cantini et al. | |
| 7,627,505 B2 | 12/2009 | Yoshida et al. | |
| 7,657,489 B2 | 2/2010 | Stambaugh | |
| 7,676,432 B2 | 3/2010 | Ling | |
| 7,693,771 B1 | 4/2010 | Zimmerman et al. | |
| 7,698,221 B2 | 4/2010 | Blinn et al. | |
| 7,698,443 B2 | 4/2010 | Yaffe et al. | |
| 7,716,091 B2 | 5/2010 | Ross | |
| 7,739,169 B2 | 6/2010 | Hammad | |
| 7,742,967 B1 | 6/2010 | Keresman, III et al. | |
| 7,783,281 B1 | 8/2010 | Cook et al. | |
| 7,784,684 B2 | 8/2010 | Labrou et al. | |
| 7,810,720 B2 | 10/2010 | Lovett | |
| 7,835,960 B2 | 11/2010 | Breck et al. | |
| 7,848,980 B2 | 12/2010 | Carlson | |
| 7,857,489 B2 | 12/2010 | Zhu et al. | |
| 7,877,288 B1 | 1/2011 | Cunningham et al. | |
| 7,883,007 B1 | 2/2011 | Crews et al. | |
| 7,907,926 B2 | 3/2011 | Rofougaran | |
| 7,929,910 B2 | 4/2011 | Chen | |
| 7,937,107 B2 | 5/2011 | Rofougaran et al. | |
| 7,946,480 B2 | 5/2011 | Miller et al. | |
| 7,962,419 B2 | 6/2011 | Gupta et al. | |
| 7,992,779 B2 | 8/2011 | Phillips et al. | |
| 8,012,219 B2 | 9/2011 | Mendez et al. | |
| 8,031,207 B2 | 10/2011 | Phillips | |
| 8,032,414 B2 | 10/2011 | Payne et al. | |
| 8,032,932 B2 | 10/2011 | Speyer et al. | |
| 8,060,413 B2 | 11/2011 | Castell et al. | |
| 8,104,674 B2 | 1/2012 | Smith et al. | |
| 8,171,531 B2 | 5/2012 | Buer | |
| 8,200,582 B1 | 6/2012 | Zhu | |
| 8,238,825 B2 | 8/2012 | Rofougaran et al. | |
| 8,245,915 B1 | 8/2012 | Ramachandran et al. | |
| 8,249,500 B2 | 8/2012 | Wilson | |
| 8,249,805 B2 | 8/2012 | de Silva et al. | |
| 8,272,562 B2 | 9/2012 | Ziegler | |
| 8,307,413 B2 | 11/2012 | Smadja et al. | |
| 8,311,895 B1 | 11/2012 | Murugan et al. | |
| 8,327,428 B2 | 12/2012 | Bailey et al. | |
| 8,327,429 B2 | 12/2012 | Speyer et al. | |
| 8,332,329 B1 * | 12/2012 | Thiele | G06Q 20/322 705/64 |
| 8,346,666 B2 | 1/2013 | Lindelsee et al. | |
| 8,380,177 B2 | 2/2013 | Laracey | |
| 8,395,242 B2 | 3/2013 | Oliver et al. | |
| 8,407,142 B1 | 3/2013 | Griggs | |
| 8,418,917 B1 | 4/2013 | Lewis et al. | |
| 8,422,462 B2 | 4/2013 | Kobayashi | |
| 8,423,466 B2 | 4/2013 | Lanc | |
| 8,459,560 B1 | 6/2013 | Mineo-Goggin | |
| 8,474,700 B1 | 7/2013 | Lewis et al. | |
| 8,494,958 B2 | 7/2013 | Schoenberg et al. | |
| 8,498,940 B2 | 7/2013 | Pelegero et al. | |
| 8,516,056 B2 | 8/2013 | Allen, Jr. et al. | |
| 8,522,039 B2 | 8/2013 | Hyndman et al. | |
| 8,538,591 B1 | 9/2013 | Klughart | |
| 8,540,142 B1 | 9/2013 | Lewis et al. | |
| 8,551,186 B1 | 10/2013 | Strand | |
| 8,572,689 B2 | 10/2013 | Radhakrishnan | |
| 8,577,804 B1 | 11/2013 | Bacastow | |
| 8,583,498 B2 | 11/2013 | Fried et al. | |
| 8,584,251 B2 | 11/2013 | McGuire et al. | |
| 8,589,266 B2 | 11/2013 | Liu et al. | |
| 8,589,271 B2 | 11/2013 | Evans | |
| 8,590,008 B1 | 11/2013 | Ellmore | |
| 8,595,812 B2 | 11/2013 | Bomar et al. | |
| 8,600,883 B2 | 12/2013 | Wong | |
| 8,612,351 B2 | 12/2013 | Liu et al. | |
| 8,620,790 B2 | 12/2013 | Priebatsch | |
| 8,631,089 B1 | 1/2014 | Pereira et al. | |
| 8,658,393 B2 | 2/2014 | Reik et al. | |
| 8,682,802 B1 | 3/2014 | Kannanari | |
| 8,683,571 B2 | 3/2014 | Zapata et al. | |
| 8,694,366 B2 | 4/2014 | Barnes, Jr. | |
| 8,714,445 B1 | 5/2014 | Katz et al. | |
| 8,768,838 B1 | 7/2014 | Hoffman | |
| 8,788,333 B2 | 7/2014 | Alba et al. | |
| 8,788,429 B2 | 7/2014 | Tieken | |
| 8,789,162 B2 | 7/2014 | Radhakrishnan | |
| 8,839,383 B2 | 9/2014 | Van Horn | |
| 8,850,575 B1 | 9/2014 | Magi Shaashua et al. | |
| 8,930,271 B1 | 1/2015 | Ellis et al. | |
| 8,943,574 B2 | 1/2015 | Bailey et al. | |
| 8,973,102 B2 | 3/2015 | Jakobsson | |
| 8,985,442 B1 | 3/2015 | Zhou et al. | |
| 8,996,423 B2 | 3/2015 | Johnson et al. | |
| 9,002,750 B1 | 4/2015 | Chu et al. | |
| 9,055,053 B2 | 6/2015 | Radhakrishnan et al. | |
| 9,069,943 B2 | 6/2015 | Radhakrishnan et al. | |
| 9,171,296 B1 | 10/2015 | Kurian | |
| 9,195,984 B1 | 11/2015 | Spector et al. | |
| 9,412,106 B2 | 8/2016 | Laracey | |
| 9,640,001 B1 * | 5/2017 | Vazquez | G07C 9/00007 |
| 9,959,535 B2 * | 5/2018 | Enzaldo | G06Q 20/04 |
| 2001/0029483 A1 | 10/2001 | Schultz et al. | |
| 2001/0029485 A1 * | 10/2001 | Brody | G06Q 20/00 705/39 |
| 2001/0034720 A1 | 10/2001 | Armes | |

(56) References Cited

U.S. PATENT DOCUMENTS

| | | | |
|---|---|---|---|
| 2001/0054111 A1 | 12/2001 | Lee et al. | |
| 2002/0032612 A1 | 3/2002 | Williams et al. | |
| 2002/0032662 A1* | 3/2002 | Maclin | G06Q 20/04 705/64 |
| 2002/0046341 A1* | 4/2002 | Kazaks | G06Q 20/04 713/182 |
| 2002/0056756 A1 | 5/2002 | Cameron et al. | |
| 2002/0072379 A1 | 6/2002 | Chen et al. | |
| 2002/0096570 A1* | 7/2002 | Wong | G06K 19/06196 235/494 |
| 2002/0111907 A1 | 8/2002 | Ling | |
| 2002/0129255 A1 | 9/2002 | Tsuchiyama et al. | |
| 2002/0152179 A1 | 10/2002 | Racov | |
| 2002/0157029 A1 | 10/2002 | French et al. | |
| 2002/0174073 A1 | 11/2002 | Nordman et al. | |
| 2002/0186845 A1 | 12/2002 | Dutta et al. | |
| 2003/0004866 A1 | 1/2003 | Huennekens et al. | |
| 2003/0009355 A1 | 1/2003 | Gupta | |
| 2003/0045328 A1 | 3/2003 | Natsuno | |
| 2003/0055733 A1 | 3/2003 | Marshall et al. | |
| 2003/0061170 A1 | 3/2003 | Uzo | |
| 2003/0105714 A1 | 6/2003 | Alarcon-Luther et al. | |
| 2003/0163787 A1 | 8/2003 | Hay et al. | |
| 2003/0177090 A1 | 9/2003 | Eden | |
| 2003/0225625 A1 | 12/2003 | Chew et al. | |
| 2004/0030645 A1 | 2/2004 | Monaghan | |
| 2004/0098308 A1 | 5/2004 | Okano | |
| 2004/0153410 A1 | 8/2004 | Nootebos et al. | |
| 2004/0254868 A1 | 12/2004 | Kirkland et al. | |
| 2005/0049977 A1* | 3/2005 | Suisa | G06Q 20/382 705/71 |
| 2005/0080730 A1 | 4/2005 | Sorrentino | |
| 2005/0131820 A1* | 6/2005 | Rodriguez | G06Q 20/04 705/42 |
| 2005/0131834 A1 | 6/2005 | Rodriguez et al. | |
| 2005/0154670 A1* | 7/2005 | Heitz | G06Q 20/04 705/39 |
| 2005/0165651 A1 | 7/2005 | Mohan | |
| 2005/0171849 A1 | 8/2005 | Brissette | |
| 2005/0222961 A1 | 10/2005 | Staib et al. | |
| 2005/0240498 A1 | 10/2005 | Thaler | |
| 2005/0246234 A1 | 11/2005 | Munyon | |
| 2005/0246275 A1 | 11/2005 | Nelson | |
| 2005/0283621 A1* | 12/2005 | Sato | G06F 21/6254 713/189 |
| 2006/0036868 A1 | 2/2006 | Cicchitto | |
| 2006/0089893 A1 | 4/2006 | Joseph et al. | |
| 2006/0095369 A1 | 5/2006 | Hofi | |
| 2006/0161501 A1 | 7/2006 | Waserstein et al. | |
| 2006/0163345 A1 | 7/2006 | Myers et al. | |
| 2006/0206709 A1 | 9/2006 | Labrou et al. | |
| 2006/0218577 A1 | 9/2006 | Goodman et al. | |
| 2006/0237531 A1 | 10/2006 | Heffez et al. | |
| 2006/0259390 A1 | 11/2006 | Rosenberger | |
| 2006/0287004 A1 | 12/2006 | Fuqua | |
| 2007/0055594 A1 | 3/2007 | Rivest et al. | |
| 2007/0073585 A1 | 3/2007 | Apple et al. | |
| 2007/0073685 A1 | 3/2007 | Thibodeau et al. | |
| 2007/0083465 A1 | 4/2007 | Ciurea et al. | |
| 2007/0100773 A1 | 5/2007 | Wallach | |
| 2007/0106611 A1* | 5/2007 | Larsen | G06Q 20/10 705/44 |
| 2007/0118747 A1 | 5/2007 | Pintsov et al. | |
| 2007/0130315 A1 | 6/2007 | Friend et al. | |
| 2007/0130463 A1 | 6/2007 | Law et al. | |
| 2007/0156517 A1 | 7/2007 | Kaplan et al. | |
| 2007/0156842 A1 | 7/2007 | Vermeulen et al. | |
| 2007/0162337 A1 | 7/2007 | Hawkins et al. | |
| 2007/0174082 A1 | 7/2007 | Singh | |
| 2007/0175977 A1 | 8/2007 | Bauer et al. | |
| 2007/0192245 A1* | 8/2007 | Fisher | G06Q 20/02 705/39 |
| 2007/0194884 A1 | 8/2007 | Didier et al. | |
| 2007/0198921 A1 | 8/2007 | Collison et al. | |
| 2007/0203835 A1 | 8/2007 | Cai | |
| 2007/0219984 A1 | 9/2007 | Aravamudan et al. | |
| 2007/0220597 A1 | 9/2007 | Ishida | |
| 2007/0223706 A1 | 9/2007 | Gantman et al. | |
| 2007/0239473 A1 | 10/2007 | Picolli | |
| 2007/0250920 A1 | 10/2007 | Lindsay | |
| 2007/0265984 A1 | 11/2007 | Santhana | |
| 2007/0276764 A1 | 11/2007 | Mann, III et al. | |
| 2007/0293192 A9* | 12/2007 | De Groot | H04L 63/0414 455/411 |
| 2008/0010193 A1 | 1/2008 | Rackley III et al. | |
| 2008/0021772 A1 | 1/2008 | Aloni et al. | |
| 2008/0040274 A1 | 2/2008 | Uzo | |
| 2008/0040276 A1 | 2/2008 | Hammad et al. | |
| 2008/0073422 A1 | 3/2008 | Zhou | |
| 2008/0109319 A1 | 5/2008 | Foss | |
| 2008/0141117 A1 | 6/2008 | King et al. | |
| 2008/0162338 A1 | 7/2008 | Samuels et al. | |
| 2008/0162589 A1 | 7/2008 | Rodeheffer et al. | |
| 2008/0167965 A1 | 7/2008 | Von Nothaus et al. | |
| 2008/0189169 A1 | 8/2008 | Turpin et al. | |
| 2008/0189210 A1 | 8/2008 | Sawhney | |
| 2008/0195499 A1 | 8/2008 | Meredith et al. | |
| 2008/0195517 A1 | 8/2008 | Minerley | |
| 2008/0195536 A1 | 8/2008 | Karns et al. | |
| 2008/0197192 A1 | 8/2008 | Lindahl et al. | |
| 2008/0217397 A1 | 9/2008 | Degliantoni et al. | |
| 2008/0275748 A1 | 11/2008 | John | |
| 2008/0281722 A1 | 11/2008 | Balasubramanian et al. | |
| 2008/0288396 A1 | 11/2008 | Siggers et al. | |
| 2008/0293397 A1 | 11/2008 | Gajdos et al. | |
| 2008/0296368 A1 | 12/2008 | Newsom | |
| 2008/0301057 A1 | 12/2008 | Oren | |
| 2008/0307515 A1 | 12/2008 | Drokov et al. | |
| 2008/0308628 A1 | 12/2008 | Payne et al. | |
| 2008/0313087 A1 | 12/2008 | Joseph et al. | |
| 2008/0319889 A1 | 12/2008 | Hammad | |
| 2009/0006230 A1 | 1/2009 | Lyda et al. | |
| 2009/0012898 A1 | 1/2009 | Sharma et al. | |
| 2009/0019534 A1 | 1/2009 | Bakshi et al. | |
| 2009/0048953 A1 | 2/2009 | Hazel et al. | |
| 2009/0057396 A1 | 3/2009 | Barbour et al. | |
| 2009/0063353 A1 | 3/2009 | Vildu et al. | |
| 2009/0070219 A1 | 3/2009 | D'Angelo et al. | |
| 2009/0100529 A1 | 4/2009 | Livnat et al. | |
| 2009/0119190 A1 | 5/2009 | Realini | |
| 2009/0121012 A1 | 5/2009 | Beemer et al. | |
| 2009/0150286 A1 | 6/2009 | Barton | |
| 2009/0164327 A1 | 6/2009 | Bishop et al. | |
| 2009/0164374 A1* | 6/2009 | Shastry | G06Q 20/02 705/44 |
| 2009/0187508 A1 | 7/2009 | Placide | |
| 2009/0192900 A1 | 7/2009 | Collison et al. | |
| 2009/0201149 A1 | 8/2009 | Kaji | |
| 2009/0222353 A1 | 9/2009 | Guest et al. | |
| 2009/0254440 A1 | 10/2009 | Pharris | |
| 2009/0261158 A1 | 10/2009 | Lawson | |
| 2009/0271265 A1 | 10/2009 | Lay et al. | |
| 2009/0281904 A1 | 11/2009 | Pharris | |
| 2009/0289764 A1 | 11/2009 | Chiu | |
| 2009/0307132 A1 | 12/2009 | Phillips | |
| 2009/0313109 A1 | 12/2009 | Bous et al. | |
| 2009/0319352 A1* | 12/2009 | Boyle | G06Q 30/00 705/14.15 |
| 2009/0327308 A1 | 12/2009 | Carter et al. | |
| 2009/0328186 A1 | 12/2009 | Pollutro et al. | |
| 2010/0010918 A1 | 1/2010 | Hunt | |
| 2010/0023449 A1 | 1/2010 | Skowronek et al. | |
| 2010/0023455 A1 | 1/2010 | Dispensa et al. | |
| 2010/0036741 A1 | 2/2010 | Cleven | |
| 2010/0042517 A1 | 2/2010 | Paintin et al. | |
| 2010/0051686 A1 | 3/2010 | Obi | |
| 2010/0064345 A1 | 3/2010 | Bentley et al. | |
| 2010/0070376 A1 | 3/2010 | Proud et al. | |
| 2010/0076833 A1 | 3/2010 | Nelsen | |
| 2010/0078762 A1 | 4/2010 | Wang | |
| 2010/0082481 A1 | 4/2010 | Lin et al. | |
| 2010/0091763 A1 | 4/2010 | Thompson | |
| 2010/0121767 A1 | 5/2010 | Coulter et al. | |

(56) References Cited

U.S. PATENT DOCUMENTS

| | | |
|---|---|---|
| 2010/0122333 A1 | 5/2010 | Noe |
| 2010/0125509 A1 | 5/2010 | Kranzley et al. |
| 2010/0133334 A1 | 6/2010 | Vadhri |
| 2010/0138344 A1 | 6/2010 | Wong et al. |
| 2010/0138347 A1 | 6/2010 | Chen |
| 2010/0145854 A1 | 6/2010 | Messerges et al. |
| 2010/0217670 A1 | 8/2010 | Reis et al. |
| 2010/0228614 A1 | 9/2010 | Zhang et al. |
| 2010/0235283 A1 | 9/2010 | Gerson |
| 2010/0235882 A1 | 9/2010 | Moore |
| 2010/0241571 A1 | 9/2010 | McDonald |
| 2010/0257099 A1 | 10/2010 | Bonalle et al. |
| 2010/0262830 A1* | 10/2010 | Kusakawa ............ G06F 21/77 713/172 |
| 2010/0268645 A1 | 10/2010 | Martino et al. |
| 2010/0274610 A1 | 10/2010 | Andersen et al. |
| 2010/0312636 A1 | 12/2010 | Coulter et al. |
| 2011/0015980 A1 | 1/2011 | Li |
| 2011/0022483 A1 | 1/2011 | Hammed |
| 2011/0040684 A1* | 2/2011 | Beck .................... G06Q 20/10 705/44 |
| 2011/0047075 A1 | 2/2011 | Fourez |
| 2011/0055008 A1 | 3/2011 | Feuerstein et al. |
| 2011/0060653 A1 | 3/2011 | King et al. |
| 2011/0078004 A1 | 3/2011 | Swanson, Sr. |
| 2011/0099104 A1 | 4/2011 | Nybom |
| 2011/0103586 A1 | 5/2011 | Nobre |
| 2011/0106631 A1 | 5/2011 | Lieberman et al. |
| 2011/0108622 A1 | 5/2011 | Das et al. |
| 2011/0113064 A1 | 5/2011 | Govindachetty et al. |
| 2011/0119156 A1 | 5/2011 | Hwang et al. |
| 2011/0131089 A1 | 6/2011 | Walker et al. |
| 2011/0131128 A1 | 6/2011 | Mikko Vaananen |
| 2011/0137470 A1 | 6/2011 | Surnilla et al. |
| 2011/0137742 A1 | 6/2011 | Parikh |
| 2011/0137797 A1 | 6/2011 | Stals et al. |
| 2011/0137804 A1 | 6/2011 | Peterson |
| 2011/0143663 A1 | 6/2011 | Renard et al. |
| 2011/0153437 A1 | 6/2011 | Archer et al. |
| 2011/0153441 A1 | 6/2011 | Smith et al. |
| 2011/0161150 A1 | 6/2011 | Steffens et al. |
| 2011/0166922 A1 | 7/2011 | Fuerstenberg |
| 2011/0166931 A1 | 7/2011 | Joa et al. |
| 2011/0166992 A1 | 7/2011 | Dessert et al. |
| 2011/0168781 A1 | 7/2011 | Akesson |
| 2011/0173055 A1 | 7/2011 | Ross et al. |
| 2011/0178889 A1 | 7/2011 | Abraham et al. |
| 2011/0184790 A1 | 7/2011 | Brar et al. |
| 2011/0184855 A1 | 7/2011 | Webber et al. |
| 2011/0191149 A1 | 8/2011 | Blackhurst et al. |
| 2011/0191161 A1 | 8/2011 | Dai |
| 2011/0191173 A1 | 8/2011 | Blackhurst et al. |
| 2011/0196790 A1 | 8/2011 | Milne |
| 2011/0202462 A1 | 8/2011 | Keenan |
| 2011/0213665 A1 | 9/2011 | Joa et al. |
| 2011/0213700 A1* | 9/2011 | Sant'Anselmo ....... G06Q 10/10 705/39 |
| 2011/0218884 A1 | 9/2011 | Kothari et al. |
| 2011/0218907 A1 | 9/2011 | Dessert et al. |
| 2011/0225064 A1* | 9/2011 | Fou ...................... G06Q 20/12 705/26.41 |
| 2011/0231268 A1 | 9/2011 | Ungos |
| 2011/0231305 A1 | 9/2011 | Winters |
| 2011/0246279 A1 | 10/2011 | Joa et al. |
| 2011/0246306 A1 | 10/2011 | Blackhurst et al. |
| 2011/0247062 A1* | 10/2011 | Zon ..................... H04L 9/3226 726/6 |
| 2011/0251892 A1 | 10/2011 | Laracey |
| 2011/0251965 A1 | 10/2011 | Holm et al. |
| 2011/0258031 A1 | 10/2011 | Valin et al. |
| 2011/0270749 A1 | 11/2011 | Bennett et al. |
| 2011/0276410 A1 | 11/2011 | Hjelm et al. |
| 2011/0277016 A1 | 11/2011 | Hockings et al. |
| 2011/0282729 A1 | 11/2011 | Gnanasambandam et al. |
| 2011/0282733 A1 | 11/2011 | Gnanasambandam et al. |
| 2011/0288998 A1 | 11/2011 | McGraw et al. |
| 2011/0302089 A1 | 12/2011 | McKenzie |
| 2012/0012651 A1 | 1/2012 | Kenna, III et al. |
| 2012/0016731 A1 | 1/2012 | Smith et al. |
| 2012/0018506 A1 | 1/2012 | Hammad et al. |
| 2012/0022944 A1 | 1/2012 | Volpi |
| 2012/0023022 A1 | 1/2012 | Carroll et al. |
| 2012/0023567 A1 | 1/2012 | Hammad |
| 2012/0028609 A1 | 2/2012 | Hruska |
| 2012/0030032 A1 | 2/2012 | Zurada |
| 2012/0030047 A1 | 2/2012 | Fuentes et al. |
| 2012/0030109 A1 | 2/2012 | Dooley Maley et al. |
| 2012/0030110 A1 | 2/2012 | Prakash et al. |
| 2012/0035997 A1 | 2/2012 | Burgess et al. |
| 2012/0036205 A1 | 2/2012 | Cole |
| 2012/0047022 A1 | 2/2012 | Shamim et al. |
| 2012/0054046 A1 | 3/2012 | Albisu |
| 2012/0054057 A1 | 3/2012 | O'Connell et al. |
| 2012/0055983 A1 | 3/2012 | Wellborn et al. |
| 2012/0066064 A1 | 3/2012 | Yoder et al. |
| 2012/0078751 A1 | 3/2012 | MacPhail et al. |
| 2012/0078762 A1 | 3/2012 | Valin et al. |
| 2012/0078782 A1 | 3/2012 | Schoenberg et al. |
| 2012/0080517 A1 | 4/2012 | Braunstein |
| 2012/0084162 A1 | 4/2012 | Smith et al. |
| 2012/0085829 A1 | 4/2012 | Ziegler |
| 2012/0089471 A1 | 4/2012 | Comparelli |
| 2012/0096499 A1 | 4/2012 | Dasher et al. |
| 2012/0111934 A1 | 5/2012 | Herzig |
| 2012/0116956 A1 | 5/2012 | Altman et al. |
| 2012/0123857 A1 | 5/2012 | Surve et al. |
| 2012/0130788 A1 | 5/2012 | Winslade et al. |
| 2012/0150728 A1 | 6/2012 | Isaacson et al. |
| 2012/0150747 A1 | 6/2012 | Carey |
| 2012/0158540 A1 | 6/2012 | Ganti et al. |
| 2012/0158584 A1 | 6/2012 | Von Behren et al. |
| 2012/0158586 A1 | 6/2012 | Ganti et al. |
| 2012/0160911 A1 | 6/2012 | Smith et al. |
| 2012/0160912 A1 | 6/2012 | Laracey |
| 2012/0166261 A1 | 6/2012 | Velusamy et al. |
| 2012/0166298 A1 | 6/2012 | Smith et al. |
| 2012/0166334 A1 | 6/2012 | Kimberg et al. |
| 2012/0171237 A1 | 7/2012 | Ching et al. |
| 2012/0173431 A1 | 7/2012 | Ritchie et al. |
| 2012/0179558 A1 | 7/2012 | Fischer |
| 2012/0185317 A1 | 7/2012 | Wong |
| 2012/0185354 A1 | 7/2012 | Crucs |
| 2012/0191522 A1 | 7/2012 | McLaughlin et al. |
| 2012/0191597 A1 | 7/2012 | Capel et al. |
| 2012/0191606 A1 | 7/2012 | Milne |
| 2012/0197743 A1 | 8/2012 | Grigg et al. |
| 2012/0197794 A1 | 8/2012 | Grigg et al. |
| 2012/0197797 A1 | 8/2012 | Grigg et al. |
| 2012/0200386 A1* | 8/2012 | Robshaw ............. H04L 9/3013 340/5.8 |
| 2012/0203700 A1 | 8/2012 | Ornce et al. |
| 2012/0203707 A1 | 8/2012 | Hungerford et al. |
| 2012/0209630 A1 | 8/2012 | Ihm et al. |
| 2012/0209749 A1 | 8/2012 | Hammad et al. |
| 2012/0209773 A1 | 8/2012 | Ranganathan |
| 2012/0209775 A1 | 8/2012 | Milne |
| 2012/0209842 A1 | 8/2012 | Bettridge et al. |
| 2012/0214571 A1 | 8/2012 | Oakes et al. |
| 2012/0215610 A1 | 8/2012 | Amaro et al. |
| 2012/0221421 A1 | 8/2012 | Hammad |
| 2012/0222055 A1 | 8/2012 | Schaefer et al. |
| 2012/0230577 A1 | 9/2012 | Calman et al. |
| 2012/0232981 A1 | 9/2012 | Torossian et al. |
| 2012/0239417 A1 | 9/2012 | Pourfallah et al. |
| 2012/0252365 A1 | 10/2012 | Lam |
| 2012/0253852 A1 | 10/2012 | Pourfallah et al. |
| 2012/0253905 A1 | 10/2012 | Darragh |
| 2012/0253913 A1 | 10/2012 | Richard |
| 2012/0253917 A1 | 10/2012 | Cho et al. |
| 2012/0253958 A1 | 10/2012 | Sock et al. |
| 2012/0253974 A1 | 10/2012 | Haikonen et al. |
| 2012/0254941 A1 | 10/2012 | Levien et al. |
| 2012/0258660 A1 | 10/2012 | Rajendran et al. |

(56) References Cited

U.S. PATENT DOCUMENTS

| | | |
|---|---|---|
| 2012/0258776 A1 | 10/2012 | Lord et al. |
| 2012/0260318 A1 | 10/2012 | Fromentoux et al. |
| 2012/0265623 A1 | 10/2012 | Zhu et al. |
| 2012/0265679 A1 | 10/2012 | Calman et al. |
| 2012/0265688 A1 | 10/2012 | Dinan |
| 2012/0265689 A1* | 10/2012 | Routhenstein ... G06K 19/06196 705/71 |
| 2012/0265694 A1 | 10/2012 | Tuchman et al. |
| 2012/0265819 A1 | 10/2012 | McGann et al. |
| 2012/0267432 A1 | 10/2012 | Kuttuva |
| 2012/0271712 A1 | 10/2012 | Katzin et al. |
| 2012/0278201 A1 | 11/2012 | Milne |
| 2012/0278242 A1 | 11/2012 | Griffith |
| 2012/0284127 A1 | 11/2012 | Heiser, II et al. |
| 2012/0284130 A1 | 11/2012 | Lewis et al. |
| 2012/0290482 A1 | 11/2012 | Atef et al. |
| 2012/0303425 A1 | 11/2012 | Katzin et al. |
| 2012/0303528 A1 | 11/2012 | Weiner et al. |
| 2012/0316963 A1 | 12/2012 | Moshfeghi |
| 2012/0316992 A1 | 12/2012 | Obome |
| 2012/0317034 A1 | 12/2012 | Guha et al. |
| 2012/0323783 A1 | 12/2012 | Canetto |
| 2012/0330846 A1 | 12/2012 | Light et al. |
| 2013/0006736 A1 | 1/2013 | Bethke et al. |
| 2013/0006756 A1 | 1/2013 | Heo |
| 2013/0006776 A1 | 1/2013 | Miller et al. |
| 2013/0013499 A1 | 1/2013 | Kalgi |
| 2013/0018706 A1 | 1/2013 | Bortolin et al. |
| 2013/0018738 A1 | 1/2013 | Faires et al. |
| 2013/0018791 A1 | 1/2013 | Mendicino et al. |
| 2013/0024360 A1 | 1/2013 | Ballout |
| 2013/0024379 A1 | 1/2013 | Di Tucci et al. |
| 2013/0031623 A1 | 1/2013 | Sanders |
| 2013/0032634 A1 | 2/2013 | McKirdy |
| 2013/0036000 A1 | 2/2013 | Giordano et al. |
| 2013/0036048 A1 | 2/2013 | Campos et al. |
| 2013/0036050 A1 | 2/2013 | Giordano et al. |
| 2013/0041811 A1 | 2/2013 | Vazquez et al. |
| 2013/0045760 A1 | 2/2013 | Obermeyer et al. |
| 2013/0046645 A1 | 2/2013 | Grigg et al. |
| 2013/0048714 A1 | 2/2013 | Sharma et al. |
| 2013/0048724 A1 | 2/2013 | Burnside et al. |
| 2013/0054336 A1 | 2/2013 | Graylin |
| 2013/0054423 A1* | 2/2013 | Hwang ............... G06Q 30/00 705/27.1 |
| 2013/0054470 A1 | 2/2013 | Campos et al. |
| 2013/0057897 A1 | 3/2013 | Park et al. |
| 2013/0060689 A1 | 3/2013 | Oskolkov et al. |
| 2013/0060708 A1 | 3/2013 | Oskolkov et al. |
| 2013/0073365 A1 | 3/2013 | McCarthy |
| 2013/0073546 A1 | 3/2013 | Yan et al. |
| 2013/0079037 A1 | 3/2013 | Dobyns |
| 2013/0085927 A1 | 4/2013 | Scott |
| 2013/0096996 A1 | 4/2013 | Tabor et al. |
| 2013/0097031 A1 | 4/2013 | Royyuru et al. |
| 2013/0097034 A1 | 4/2013 | Royyuru et al. |
| 2013/0097683 A1 | 4/2013 | Davis et al. |
| 2013/0109412 A1 | 5/2013 | Nguyen et al. |
| 2013/0110607 A1 | 5/2013 | Basmajian et al. |
| 2013/0110658 A1 | 5/2013 | Lyman et al. |
| 2013/0117170 A1 | 5/2013 | Coppinger |
| 2013/0124346 A1 | 5/2013 | Baldwin et al. |
| 2013/0124396 A1 | 5/2013 | Loff |
| 2013/0124855 A1 | 5/2013 | Varadarajan et al. |
| 2013/0143600 A1 | 6/2013 | Jan et al. |
| 2013/0150139 A1 | 6/2013 | Oakes |
| 2013/0159178 A1 | 6/2013 | Colon et al. |
| 2013/0159186 A1* | 6/2013 | Brudnicki ............ G06Q 20/227 705/44 |
| 2013/0166332 A1 | 6/2013 | Hammad |
| 2013/0166384 A1 | 6/2013 | Das |
| 2013/0179254 A1 | 7/2013 | Joa et al. |
| 2013/0179341 A1 | 7/2013 | Boudreau |
| 2013/0179954 A1 | 7/2013 | Bidare |
| 2013/0191227 A1 | 7/2013 | Pasa et al. |
| 2013/0202185 A1 | 8/2013 | Irwin, Jr. et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0226799 A1 | 8/2013 | Raj |
| 2013/0238503 A1 | 9/2013 | Patel |
| 2013/0246147 A1 | 9/2013 | Chen et al. |
| 2013/0246171 A1 | 9/2013 | Carapelli |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0256403 A1 | 10/2013 | Keith |
| 2013/0262198 A1 | 10/2013 | Chung |
| 2013/0262315 A1 | 10/2013 | Hruska |
| 2013/0267224 A1 | 10/2013 | Krishnaswamy et al. |
| 2013/0268437 A1 | 10/2013 | Desai et al. |
| 2013/0282577 A1 | 10/2013 | Milne |
| 2013/0290101 A1 | 10/2013 | Arini et al. |
| 2013/0304637 A1 | 11/2013 | McCabe et al. |
| 2013/0304651 A1 | 11/2013 | Smith |
| 2013/0311365 A1 | 11/2013 | Miller et al. |
| 2013/0318627 A1 | 11/2013 | Lundkvist et al. |
| 2013/0324166 A1 | 12/2013 | Mian et al. |
| 2013/0339122 A1 | 12/2013 | Truitt et al. |
| 2013/0339165 A1 | 12/2013 | Caiman |
| 2013/0346171 A1 | 12/2013 | Wright |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0019352 A1 | 1/2014 | Shrivastava |
| 2014/0019358 A1 | 1/2014 | Priebatsch |
| 2014/0025581 A1 | 1/2014 | Calman |
| 2014/0025958 A1 | 1/2014 | Calman |
| 2014/0040001 A1 | 2/2014 | Harvey et al. |
| 2014/0048595 A1 | 2/2014 | Grigg et al. |
| 2014/0058946 A1 | 2/2014 | Paranjape |
| 2014/0067661 A1* | 3/2014 | Elischer ............... G06Q 20/042 705/39 |
| 2014/0067678 A1 | 3/2014 | Lee et al. |
| 2014/0095383 A1 | 4/2014 | Rao |
| 2014/0118719 A1 | 5/2014 | Frogget et al. |
| 2014/0122331 A1 | 5/2014 | Vaish et al. |
| 2014/0129357 A1 | 5/2014 | Goodwin |
| 2014/0130127 A1 | 5/2014 | Toole et al. |
| 2014/0136323 A1 | 5/2014 | Zhang et al. |
| 2014/0136405 A1 | 5/2014 | DuCharme et al. |
| 2014/0143089 A1 | 5/2014 | Campos et al. |
| 2014/0143145 A1 | 5/2014 | Kortina et al. |
| 2014/0156535 A1 | 6/2014 | Jabbour et al. |
| 2014/0164243 A1 | 6/2014 | Aabye et al. |
| 2014/0172707 A1 | 6/2014 | Kuntagod et al. |
| 2014/0187147 A1 | 7/2014 | Rochberger et al. |
| 2014/0187148 A1 | 7/2014 | Taite et al. |
| 2014/0188719 A1 | 7/2014 | Poornachandran et al. |
| 2014/0208401 A1 | 7/2014 | Balakrishnan et al. |
| 2014/0214640 A1 | 7/2014 | Mallikarjunan et al. |
| 2014/0231527 A1* | 8/2014 | Anderson ......... G06K 19/06196 235/492 |
| 2014/0244493 A1 | 8/2014 | Kenyon et al. |
| 2014/0244503 A1 | 8/2014 | Sadlier |
| 2014/0244510 A1* | 8/2014 | de Beasley .......... G06Q 50/265 705/44 |
| 2014/0245391 A1 | 8/2014 | Adenuga |
| 2014/0250009 A1 | 9/2014 | Carlson |
| 2014/0258157 A1 | 9/2014 | Pridmore et al. |
| 2014/0279476 A1 | 9/2014 | Hua |
| 2014/0279494 A1 | 9/2014 | Wiesman et al. |
| 2014/0279554 A1 | 9/2014 | Priebatsch et al. |
| 2014/0279566 A1 | 9/2014 | Verma et al. |
| 2014/0279688 A1 | 9/2014 | Ginsberg et al. |
| 2014/0310764 A1 | 10/2014 | Tippett et al. |
| 2014/0315159 A1 | 10/2014 | Mukheijee et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0344153 A1 | 11/2014 | Raj et al. |
| 2014/0351125 A1 | 11/2014 | Miller et al. |

(56) References Cited

U.S. PATENT DOCUMENTS

| | | |
|---|---|---|
| 2014/0359709 A1 | 12/2014 | Nasser et al. |
| 2014/0365334 A1 | 12/2014 | Hurewitz |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032625 A1 | 1/2015 | Dill et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0088740 A1* | 3/2015 | Doyle ............... G06Q 40/00 705/42 |
| 2015/0100495 A1 | 4/2015 | Salama et al. |
| 2015/0100788 A1 | 4/2015 | Chastain et al. |
| 2015/0106275 A1 | 4/2015 | Wolfs et al. |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0199679 A1 | 7/2015 | Palanisamy et al. |
| 2015/0206131 A1 | 7/2015 | Phillips et al. |
| 2015/0206137 A1 | 7/2015 | Mazarim Fernandes |
| 2015/0220914 A1 | 8/2015 | Purves et al. |
| 2015/0254648 A1 | 9/2015 | Clements et al. |
| 2015/0254650 A1 | 9/2015 | Bondesen et al. |
| 2015/0254653 A1 | 9/2015 | Bondesen et al. |
| 2015/0254664 A1 | 9/2015 | Bondesen et al. |
| 2015/0269542 A1* | 9/2015 | Katz .................. G06Q 20/10 705/44 |
| 2015/0278814 A1 | 10/2015 | Jaffe |
| 2016/0117660 A1 | 4/2016 | Prakash et al. |
| 2016/0210652 A9* | 7/2016 | Boyle .............. G06Q 30/00 |
| 2016/0224977 A1 | 8/2016 | Sabba et al. |
| 2017/0206544 A1* | 7/2017 | Carity ............ G06Q 30/0225 |

FOREIGN PATENT DOCUMENTS

| | | |
|---|---|---|
| JP | 2008225832 A | 9/2008 |
| WO | 9907121 A2 | 2/1999 |
| WO | 03007221 A2 | 1/2003 |
| WO | 2012058099 A1 | 5/2012 |
| WO | 2013095486 A1 | 6/2013 |

OTHER PUBLICATIONS

'Digital Wallet' to pay for travel hasn't arrived yet, Orlando Sentinel [Orlando, Fla], Jan. 27, 2013; p. J.6.

Business Wire, "World's First and Only Global Mobile Wallet Sees Strong User Adoption with 150 Million Miles Loaded to Cash in First Month of Launch", Nov. 28, 2012, Zurich.

Simon, "Credit-Card Reward Programs: A Short History; Credi"; Creditcards.com, Nov. 2006, 4 pages.

Lane, "History of APIs; APIE"; APIEvangelist.com; Dec. 2012, 11 pages.

* cited by examiner

SYSTEM FOR USER AUTHENTICATION BASED ON LINKING A RANDOMLY GENERATED NUMBER TO THE USER AND A PHYSICAL ITEM

FIELD

In general, embodiments of the invention relate to authentication and, more particularly, a system that authenticates a receiver of a physical item based on linking a randomly generated number to the receiver and the physical item.

BACKGROUND

In many instances physical items, which are provided by one entity (i.e., a presenter) to another entity (i.e., a recipient) for the subsequent use/processing by the recipient, require security features to insure that the recipient of the physical item is, in fact, the subsequent user/processor of the physical item. In other words, security measures are required to taken to insure that the physical item hasn't fallen into a wrongdoers hands, such that the subsequent user/processor is someone other than the intended recipient.

Additionally many of such physical items may contain personal information which the presenter does not wish to divulge to the recipient for security reasons. Furthermore, such physical items often contain information that makes the physical item susceptible to unauthorized duplication (i.e., counterfeiting or the like).

In one specific example, payment instruments such as personal checks, which are provided by the check presenter to a recipient may subsequently come into the possession of someone or entity other than the intended recipient (i.e., wrongful recipient). In the event the wrongful recipient attempts to present the check for payment the only means of preventing such from occurring is requesting identification from the wrongful recipient, which is often an easy process to circumvent through alteration of the check or deceptive identification.

Additionally, payment instruments such as personal checks or the like may not only identify the account holder and their address but also contain a financial institution's routing number, an account number and a check number. Typically, personal checks are distributed to the account holder in sequential order and, as such, the account holder issues the checks, to payees, in the sequential order. Such sequential ordering of the personal checks makes it easy for a wrongdoer to duplicate the check with a slightly higher sequential number than the original/duplicated check and proceed with an attempt to make payment on the duplicate check.

Therefore, a need exists to develop systems, apparatus, method and/or computer program products that insure that a subsequent user/processor of a physical item is, in fact, the intended user/processor (i.e., the intended recipient). In addition, a need exists to insure that such physical items do not contain unnecessary personal information so that the recipient of the personal item is not exposed to the unnecessary personal information. Moreover, a need exists to insure that the physical item is not readily susceptible to unauthorized duplication.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for authenticating recipients of a physical item based on generating a random number and linking the random number to the physical item and the intended recipient. Once the intended recipient is in possession of the physical item and the generated random number, the intended recipient is authorized for the purpose of using/processing the physical item by presenting the random number for recipient authentication. Such authentication insures that the user/processor of the physical item is the intended user/recipient.

In other embodiments of the invention, the physical item is generated such that the random number is included on the physical item and replaces at least a portion of the personal information on the physical item. In still further embodiments of the invention, a mobile application is implemented to conduct one or more of (i) generating the random number, (ii) linking the random number to the physical item and the recipient, and (iii) generating the physical item, such that, the mobile application provides conducting (i), (ii) and/or (iii) dynamically and on-demand. In still further embodiments of the invention, the random number is further linked to parameters associated with the using/processing of the physical item, such as number of uses, use volume, timing of use and the like, such that, the use/processing of the physical item must meet the linked parameters in order for the use/processing to proceed.

A system for authenticating a recipient of a physical item defines first embodiments of the invention. The system includes a random number generator stored in first memory, executable by one or more first processors and configured to generate a random number. The system further includes a linking application stored in second memory, executable by one or more second processors and configured to link the random number with a physical item, a presenter of the physical item and a recipient of the physical item and store the random number and linked physical item, presenter and recipient in an authentication database. In addition, the system includes an authentication module stored in third memory, executable by one or more third processors and configured to, in response to receiving an input of a number from the recipient or a source associated with the recipient, access the authentication database to compare the inputted number to the random number and, in response to determining a match between the inputted number and the random number, authenticate the recipient.

In specific embodiments the system further includes a physical item-generator application stored in fourth memory, executable by one or more fourth processors and configured to generate the physical item that includes the random number in place of information associated with the presenter. In related specific embodiments of the system the physical-item generator application is further defined as a check-generator application configured to generate a personal check that includes the random number in place of at least a portion of one or more of a routing number, an account number and a check number, or, in some embodiments, in place of the routing number, the account number and the check number.

In other specific embodiments the system further includes a mobile application that includes the random number generator and the linking application. The mobile application is executed dynamically and on-demand on a mobile device associated with the presenter. In other related embodiments of the system the mobile application includes the random number generator, the linking application and the physical item-generator application, such that (i) generating the random number, (ii) the linking of the random number with the physical item, the presenter and the receiver, and (iii) generating the physical item are all conducted dynamically on-demand.

In still further specific embodiments the system includes a processing module stored in fourth memory, executable by one or more processors and configured to, in response to authenticating the receiver, process the physical item. In related embodiments of the system, the linking application is further configured to link the random number to at least one of a quantity of processing transactions, a processing transaction limit and a period of time for conducting one or more processing transactions. In such embodiments of the system, the processing module is further configured to verify, prior to processing the physical item, based on the random number, at least one of (i) the processing of the physical item is within the quantity of processing transactions, (ii) the processing of the physical item is within the processing transaction limit, and (iii) the processing of the physical item is within the period of time. In specific embodiments of the system, the processing module is further defined as a transaction module configured to, in response to authenticating the recipient, conduct a payment transaction in which the presenter is a payor and the recipient is a payee.

In additional specific embodiments of the system, the physical item is further defined as a payment instrument. In specific embodiments of the system, the payment instrument is one of a personal check or a credit card. In other specific embodiments of the system, the payment instrument is a series of personal checks, each of the personal checks designated for payment to the receiver.

A system for authenticating a payee during a transaction defines second embodiments of the invention. The system includes a random number generator stored in first memory, executable by one or more first processors and configured to generate a random number. The system further includes a linking application stored in second memory, executable by one or more second processors and configured to link the random number with a physical payment instrument, a payor and a payee and store the random number and linked payment instrument, payor and payee in an authentication database. In addition, the system includes an authentication module stored in third memory, executable by one or more third processors and configured to, in response to receiving an input of a number from the payee or a payee source, access the authentication database to compare the inputted number to the random number and, in response to determining a match between the inputted number and the random number, authenticate the payee.

In specific embodiments the system further includes a payment instrument-generator application stored in fourth memory, executable by one or more fourth processors and configured to generate a payment instrument that includes the random number in place of at least a portion of at least one of a routing number, an account number and a check number. In such embodiments the system may further include a mobile application that includes one or more of the random number generator, the linking application and the payment instrument generator application. The mobile application is executed on a mobile device associated with the payor and at least one of (i) generating the random number, (ii) the linking of the random number with the payment instrument, the payor and the payee is conducted dynamically on-demand. In related embodiments of the A system for generating a payment instrument with a randomly generated number defines third embodiments of the invention. The system includes a random number generator stored in first memory, executable by one or more first processor and configured to generate a random number. The system further includes a linking application stored in second memory, executable by one or more second processors and configured to link the random number with a physical payment instrument, and a payor, and store the random number and linked payment instrument and payor in an authentication database. In addition, the system includes a payment instrument-generator application stored in third memory, executable by one or more third processors and configured to generate a payment instrument that includes the random number in place of at least a portion of at least one of a routing number, an account number and a check number.

Thus, systems, apparatus, methods, and computer program products herein described in detail below provide for authenticating recipients of a physical item based on generating a random number and linking the random number to the physical item and the intended recipient. Once the intended recipient is in possession of the physical item and the generated random number, the intended recipient is authorized for the purpose of using/processing the physical item by presenting the random number for recipient authentication. Such authentication insures that the user/processor of the physical item is the intended user/recipient. In specific embodiments of the invention, the physical item is a payment instrument. In other specific embodiments of the invention, the physical item is generated with the random number included in place of personal information associated with the provider. Such configuration limits the unnecessary dissemination of personal information and lessens the likelihood of unauthorized duplication of the physical item.

BRIEF DESCRIPTION OF THE DRAWINGS

Figure 1:
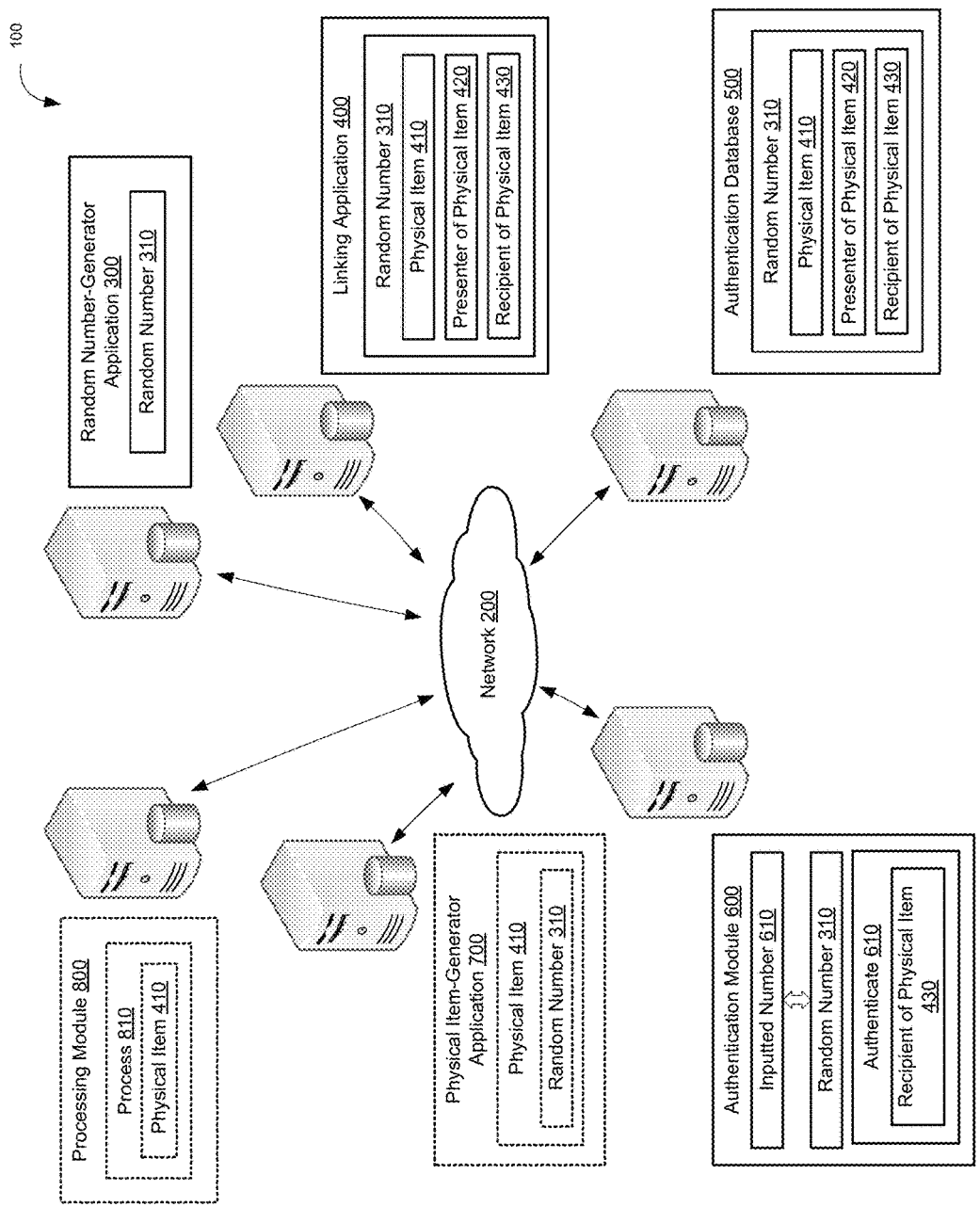
Figure 2:
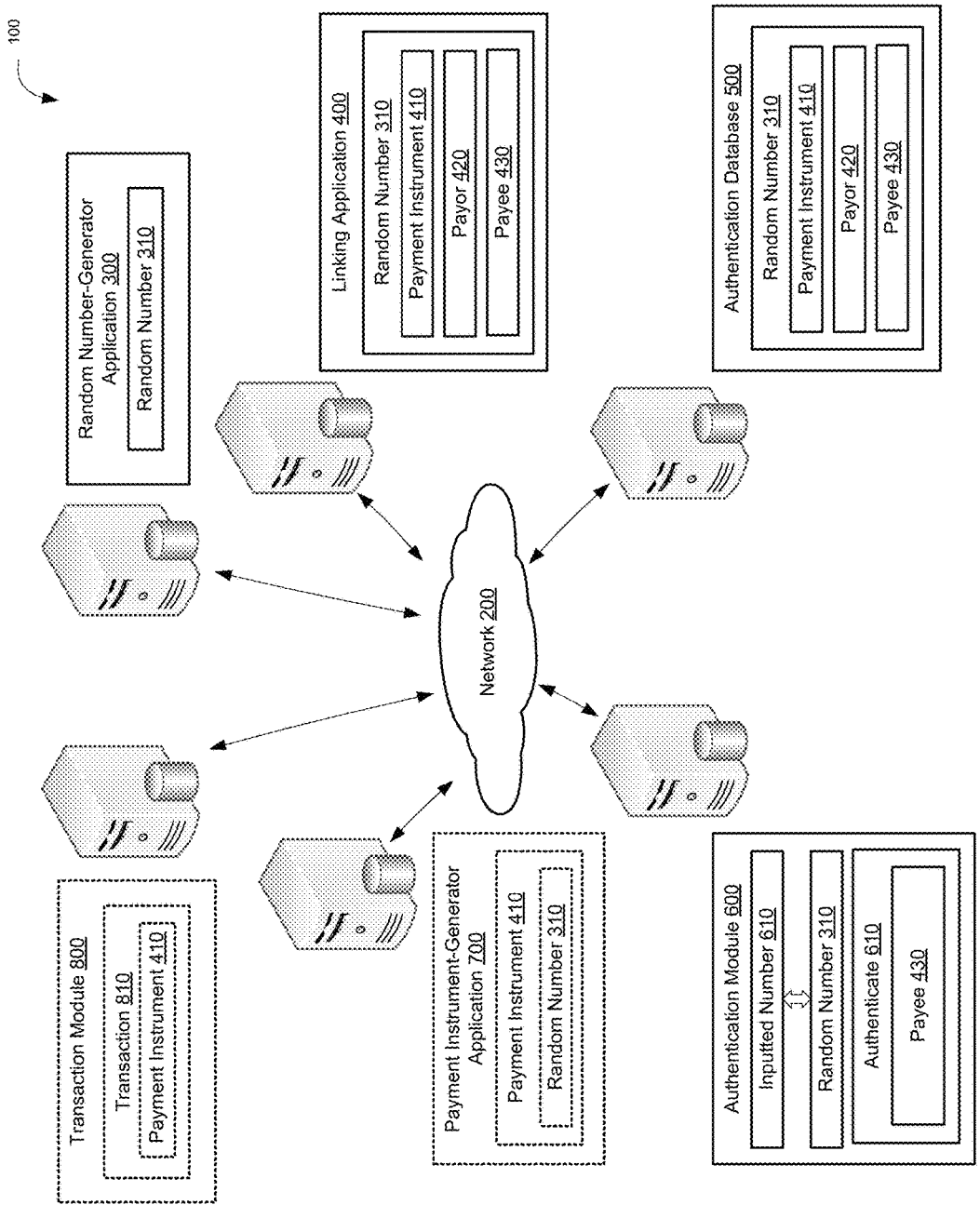
Figure 3:
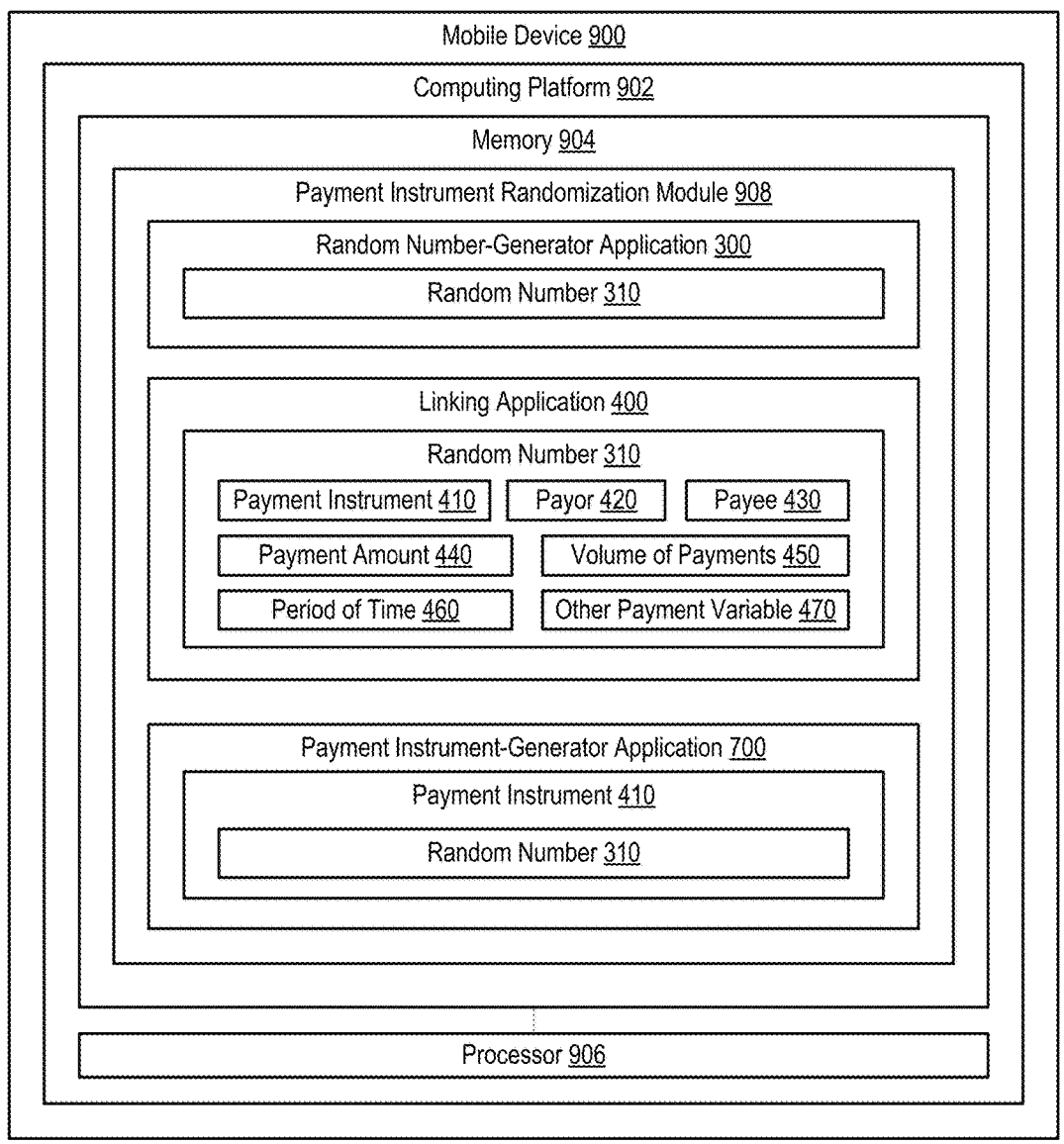
Figure 4:
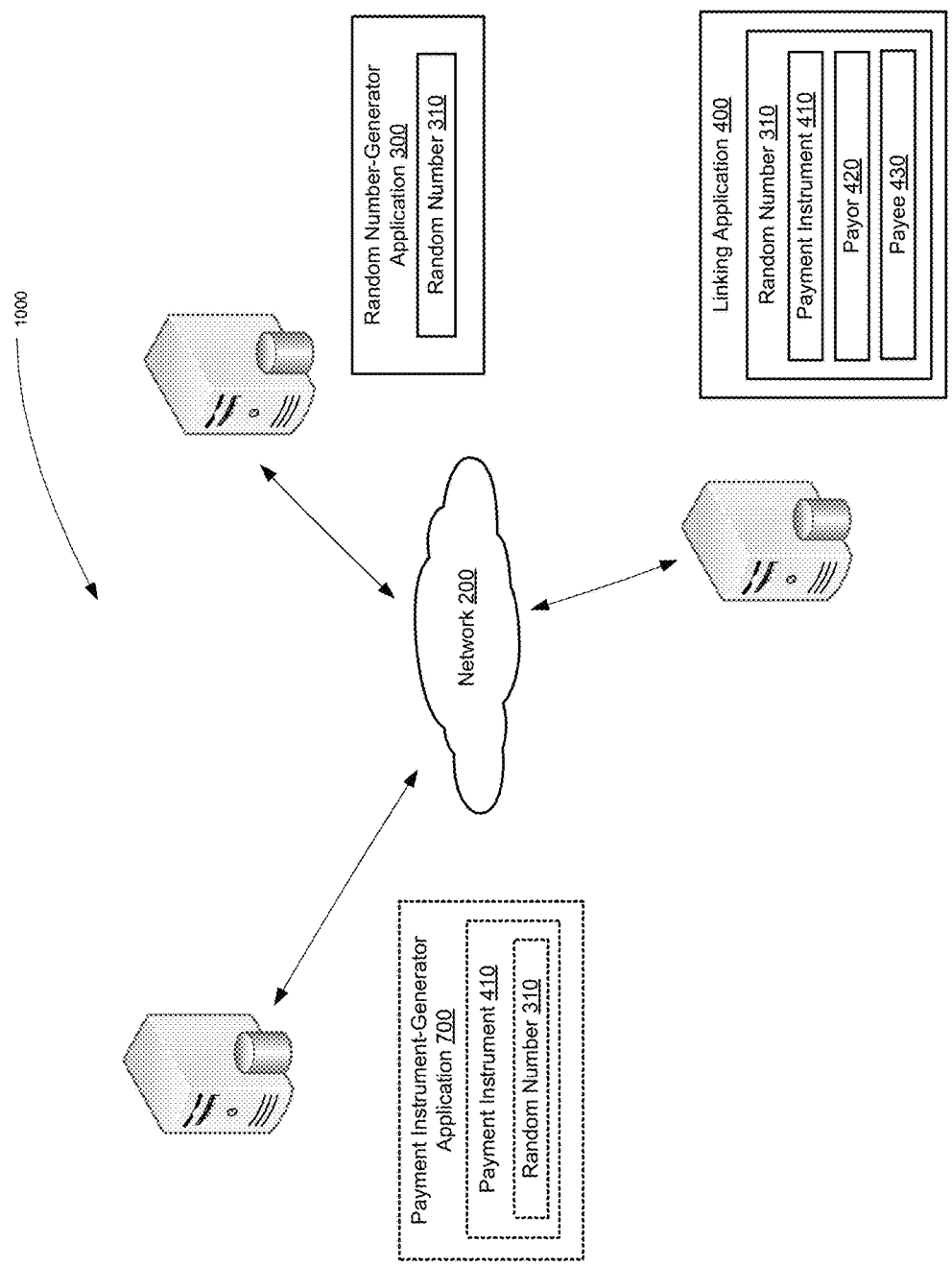
Figure 5:
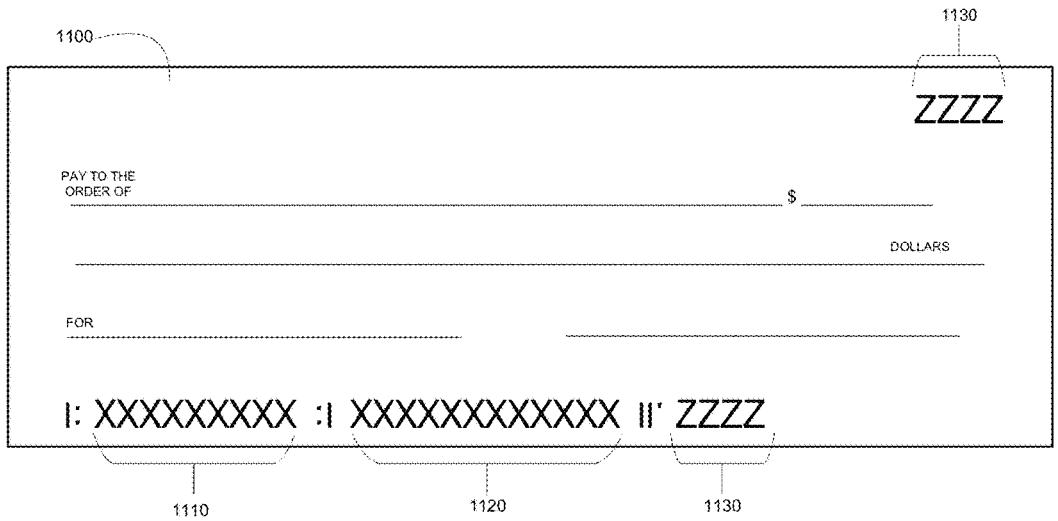
Figure 6:
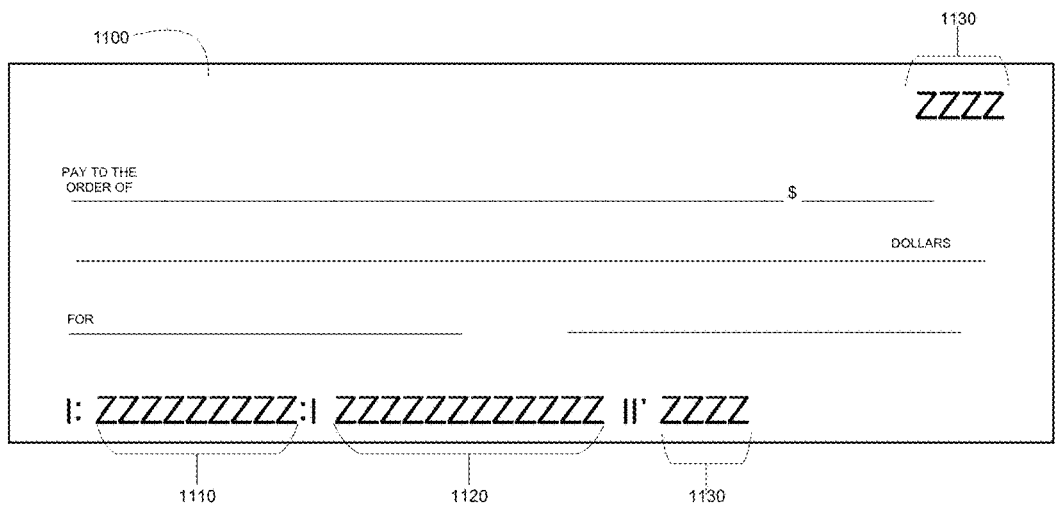

Having thus described embodiments of the invention in general terms, reference will now be made to the accompanying drawings, which are not necessarily drawn to scale, and wherein:

FIG. 1 provides a schematic diagram of a system for authenticating recipients of a physical item based on generating a random number and linking the number to the physical item, in accordance with embodiments of the present invention;

FIG. 2 provides a schematic diagram of a system for authenticating recipients of a payment instrument based on generating a random number and linking the number to the payment instrument, in accordance with embodiments of the present invention;

FIG. 3 provides a block diagram of a mobile device configured for generating a random number, linking the random number to a payment instrument and generating the payment instrument including the random number;

FIG. 4 provides a schematic diagram of a system for generating a random number, linking the random number to a payment instrument and generating the payment instrument including the random number, in accordance with embodiments of the present invention; and FIGS. 5 & 6 provide examples of payment instruments configured to include a random number in place of personal information, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for authenticating recipients of a physical item based on generating a random number and linking the random number to the physical item and the intended recipient. Once the intended recipient is in possession of the physical item and the generated random number, the intended recipient is authorized for the purpose of using/processing the physical item by presenting the random number for recipient authentication. Such authentication insures that the user/processor of the physical item is the intended user/recipient.

In other embodiments of the invention, the physical item is generated such that the random number is included on the physical item and replaces at least a portion of the personal information on the physical item. In still further embodiments of the invention, a mobile application is implemented to conduct one or more of (i) generating the random number, (ii) linking the random number to the physical item and the recipient, and (iii) generating the physical item, such that, the mobile application provides conducting (i), (ii) and/or (iii) dynamically and on-demand. In still further embodiments of the invention, the random number is further linked to parameters associated with the using/processing of the physical item, such as number of uses, use volume, timing of use and the like, such that, the use/processing of the physical item must meet the linked parameters in order for the use/processing to proceed.

FIG. 1 provides a schematic diagram of a system 100 for authenticating the recipient of a physical item based on generating a random number and linking the random number to the physical item, in accordance with embodiments of the present invention. The system 100 is implemented in a distributed computing environment and, as such information is communicated between apparatus via network 200, which may comprise the Internet and/or an intranet. System 300 includes a random number-generator application 300 this is configured to generate a random number 310, also referred to as a token, Personal Identification Number (PIN) or the like. In this regard the "random number" may be solely numeric or the random number may be an alpha-numeric. In addition, the random number may of any length (i.e., number of digits) and the length may be dictated by the specific use of the random number (e.g., the number of characters in the personal information that is being replaced by the random number). The random number generator application 300 may be deployed as a mobile device application, implemented in a mobile communication device (e.g., cellular telephone), standalone key fob device or the like. Additionally, the random number generator application may be deployed by the entity issuing the physical item 410 and/or the entity presenting the physical item 410 (herein, referred to as the presenter 420).

System 100 additionally includes linking application 400 that is configured to link or otherwise associate the random number 310 with the physical item 410, the presenter 420 of the physical item 410 and the recipient 430 of the physical item 410. In alternate embodiments of the invention, the random number may be linked with other parameters associated with processing the physical item, such as, but not limited to, the number of processing runs, the time period designated for processing and the like. In response to linking the random number to the parameters/attributes, the random number 310 and linked physical item 410, linked presenter 420 and linked recipient 430 are stored in an authentication database 500.

System 100 also includes authentication module 600 that is configured to receive an inputted number 610 from an entity in possession of the physical item 410 (which should be the recipient 430) and the associated random number 310 (i.e., after the recipient has received the physical item and the associated random number 310). In alternate embodiments of the system, the inputted number 610 may be received from a source associated with the entity (i.e., not directly from the entity). In this regard, for the purpose of authentication, the inputted number 610 will be (or should be) the random number 310. In response to receiving the inputted number 619, the authentication module 600 is configured to access the authentication database 500 to compare the inputted number to the random number and identify the linked physical item 410 and the linked recipient 430. If the entity or source associated with the entity that provided the inputted number 610 matches the linked recipient 430 in the authentication database 430, the entity is authenticated 620 (i.e., deemed to be the linked recipient 430). Authentication of the recipient 430 provides authorization for the recipient to use/process the physical item.

In optional embodiments the system 100 includes physical-item generator application 700 configured to generate the physical item 410 including indicia that includes the random number 310. In specific embodiments, the random number replaces at least a portion of personal information associated with the presenter. By replacing some, if not all, of the personal information on the physical item, less personal information is disseminated and the risk of unauthorized duplication of the physical item is lessened.

In other optional embodiments the system 100 includes processing module 800 that is configured to, upon authentication 610 of the recipient 430, process 810 the physical item 410. The processing 810 implemented is specific to the type/intended use of the physical item 410. As previously noted, in specific embodiments, the random number is additionally linked to processing parameters that control one or more facets of the processing, such as, volume of processing/use runs, allowable time period for processing/using the physical item or the like.

Referring to FIG. 2, a schematic diagram of one embodiment of the system 100 for authenticating a payee receiving a payment instrument based on generating a random number and linking the random number to the payment instrument, in accordance with embodiments of the present invention. The payment instrument may be any tangible item, such as a personal check, a debit/credit card or the like.

As previously discussed in relation to FIG. 1, system 300 includes a random number-generator application 300 this is configured to generate a random number 310, also referred to as a token, Personal Identification Number (PIN) or the like. In instances in which the random number 300 is used to replace the routing number, the account number and the check number on a personal check the random number may be 25 characters in length, while in other embodiments in which the random number is used to replace only the check number the random number may be 4 characters in length. In other instances in which the random number is used to replace the account number on a credit card the random number may be 15 or 16 characters in length.

System 100 additionally includes linking application 400 that is configured to link or otherwise associate the random number 310 with the payment instrument 410, the payor 420 of the payment instrument 410 (i.e., the account holder) and the payee 430 of the payment instrument 410 (i.e., the individual/entity receiving the personal check or the merchant/entity processing a credit/debit transaction). In alternate embodiments of the invention, the random number may be linked with other parameters associated with transaction associated with the payment instrument, such as, but not limited to, the payment amount/limit, the number of payments authorized, the time period designated for processing the transaction and the like. In response to linking the random number to the parameters/attributes, the random number 310 and linked payment instrument 410, linked payor 420 and linked payee 430 are stored in an authentication database 500.

System 100 also includes authentication module 600 that is configured to receive an inputted number 610 from an entity in possession of the payment instrument 410 (which should be the payee 430) and the associated random number 310 (i.e., after the payee 430 has received the payment instrument 410 and the associated random number 310). In alternate embodiments of the system, the inputted number 610 may be received from a source associated with the entity (i.e., not directly from the entity); for example, from a transaction processing unit that reads coded-indicia or magnetically stored data from the payment instrument 410. In this regard, for the purpose of authentication, the inputted number 610 will be (or should be) the random number 310. In response to receiving the inputted number 619, the authentication module 600 is configured to access the authentication database 500 to compare the inputted number to the random number and identify the linked payment instrument 410 and the linked payee 430. If the entity or source associated with the entity that provided the inputted number 610 matches the linked payee 430 in the authentication database 430, the entity is authenticated 620 (i.e., deemed to be the linked payee 430). Authentication of the payee 430 provides authorization for the payee to proceed with the payment transaction.

In optional embodiments the system 100 includes payment instrument generator application 700 that is configured to generate the payment instrument 410 (e.g., the personal check or credit/debit card) including indicia that includes the random number 310. The payment instrument generator application 700 may be implemented by the payment instrument issuer (i.e., financial institution or the like) or the payment instrument generator application 700 may be implemented by the payor (via a web-based or mobile application or the like). In specific embodiments, the random number replaces at least a portion of personal information associated with the presenter. For example, in the personal check embodiments, the random number may replace all or a portion of the routing number, the account number or the check number, while in the credit/debit card scenario, the random number may replace all or a portion of the account number. By replacing some, if not all, of the personal information on the payment instrument, less personal information (i.e., account numbers, check numbers and the like) is made public and the risk of unauthorized duplication (i.e., counterfeiting) of the payment instrument is lessened because, for example, a wrongdoer will be unable to deduce next-in-line sequential ordering of checks. In other embodiments of the system, in which the random number 310 is not included within the payment instrument, the random number/token/PIN 310 is delivered and/or received by the payee separate from the payment instrument 410.

In other optional embodiments the system 100 includes transaction module 800 that is configured to, upon authentication 610 of the payee 430, to process/transact 810 the payment instrument 410, such that the payee receives payment. As previously noted, in specific embodiments, the random number is additionally linked to transactions parameters that control one or more facets of the transaction, such as, but not limited to, the amount or amount limits of the transaction, the volume of transactions allowed by the payee, allowable time period for conducting the transaction (e.g., immediate processing (i.e., within a few minutes) or processing the transaction within a prescribed number of days) the like.

Referring to FIG. 3 a block diagram is presented of a mobile device 900, which is configured for generating a random number, linking the random number to a payment instrument and generating the payment instrument with the random number included therein, in accordance with embodiments of the present invention. In addition to providing greater detail, FIG. 3 highlights various alternate embodiments of the invention. The mobile device 900 may include any portable computing device. While FIG. 3 illustrates a mobile device, the functionality shown and described in FIG. 3 may be implemented in other devices or apparatus, such as Internet-based apparatus accessible to a payor through an Internet/web application or the like.

The mobile device 900 includes computing platform 902 that can receive and execute algorithms, such as routines, and applications. Computing platform 902 includes memory 904, which may comprise volatile and non-volatile memory, such as read-only and/or random-access memory (RAM and ROM), EPROM, EEPROM, flash cards, or any memory common to computer platforms. Further, memory 904 may include one or more flash memory cells, or may be any secondary or tertiary storage device, such as cloud storage, magnetic media, optical media, tape, or soft or hard disk.

Further, computing platform 902 also includes processor 906, which may be an application-specific integrated circuit ("ASIC"), or other chipset, processor, logic circuit, or other data processing device. Processor 906 or other processor such as ASIC may execute an application programming interface ("API") (not shown in FIG. 4) that interfaces with any resident programs, such as payment instrument randomization module 908 and routines, sub-modules associated therewith or the like stored in the memory 904 of the mobile device 900.

Processor 906 includes various processing subsystems (not shown in FIG. 3) embodied in hardware, firmware, software, and combinations thereof, that enable the functionality of mobile device 900 and the operability of the mobile device 900 on a network. For example, processing subsystems allow for initiating and maintaining communications and exchanging data with other networked devices. For the disclosed aspects, processing subsystems of processor 906 may include any subsystem used in conjunction with payment instrument randomization module 908 and related algorithms, sub-algorithms, sub-modules thereof.

Computer platform 902 may additionally include communications module (not shown in FIG. 3) embodied in hardware, firmware, software, and combinations thereof, that enables communications among the various components of the mobile device 900, as well as between the other networked devices. Thus, communication module may include the requisite hardware, firmware, software and/or combinations thereof for establishing and maintaining a network communication connection.

As previously discussed in relation to FIG. 3, the memory 904 of mobile device 900 stores payment instrument randomization module 908 which is configured to generate, dynamically and/or on-demand, payment instruments, such as personal checks or the like, which includes indicia that replaces at least a portion of the personal information normally found on such a payment instrument with a random number, otherwise referred to as a token, key, Personal Identification Number (PIN) or the like.

Thus, payment instrument randomization module 908 includes a random number-generator application 300 this is configured to receive a random number request from the mobile device user and, in response, generate the random number 310. The user may designate/request the number of numerals/characters in the random number or the application 300 may be preconfigured to generate the random number with a prescribed number of numerals/characters.

Module 908 additionally includes linking application 400 that is configured to link or otherwise associate the random number 310 with the payment instrument 410, the payor 420 of the payment instrument 410 (typically, the mobile device user) and the payee 430 of the payment instrument 410 (i.e., the individual/entity receiving the randomized payment instrument). In this regard, based on previous user authentication, the module 908 is configured to automatically link the random number 310 to the payor 430. In addition, the module 908 is configured to request that the mobile device user input a payor name 430 and, in response to the mobile device user making the requisite payor input, the module 908 links the random number to the payor 430. Additionally, the module 908 may be configured to link the random number to payment instrument 310 (e.g., next sequentially ordered payment instrument) or, in other embodiments, the module may be configured to allow (or override the module configured random number to payment instrument link) the mobile device user to define which payment instrument to link to the random number (e.g., user defines which personal check number to link to the random number).

In optional embodiments of the invention, the linking application 400 is further configured to link the random number 310 to payment/transaction parameters, such as, but not limited to, the payment/transaction amount 440 or payment limit, the volume/number of payments/transactions 450 (e.g., the number of payment instruments to be generated), the time period for conducting the payment transaction 460 or any other payment transaction parameter/variable 470. The linked payment/transaction parameters may be predetermined by the linking application (e.g., the entity/financial institution making the payment) or the mobile device user may dynamically define the linked payment/transaction parameters. For example, the linking application 400 may be configured to allow for a 90 day period of time 440 for conducting the transaction (e.g., depositing/cashing the personal check); however, the application 400 may be further configured to allow the user to override the predetermined period of time 440 and input a user-defined period of time, such as, minimal time for a Point-Of-Sale (POS) transaction, twenty-four (24) hours, seven days or the like.

The payment instrument randomization module 908 includes payment instrument generator application 700 that is configured to generate the payment instrument 410 (e.g., the personal check or credit/debit card) including indicia that includes the random number 310. In specific embodiments, the random number replaces at least a portion of personal information associated with the presenter. For example, in those embodiments in which the payment instrument 410 is a personal check, as shown and described in FIGS. 5 and 6, infra, the random number may replace all or a portion of the routing number, the account number or the check number. As previously discussed, by replacing some, if not all, of the personal information on the payment instrument, less personal information (i.e., account numbers, check numbers and the like) is made public and the risk of unauthorized duplication (i.e., counterfeiting) of the payment instrument is lessened because, for example, a wrongdoer will be unable to deduce next-in-line sequential ordering of checks. In specific embodiments, payment instrument generator application 700 is configured to generate physical personal check and/or virtual personal checks. In this regard, the payment instrument generator application 700 may be in wireless communication with printing devices to allow for the application 700 to send signals to the printer to print the physical personal check. In other embodiments of the invention, the virtual check may be wirelessly communicated to the payee 430, such as to a merchant's POS system or the like for subsequent payment/transaction processing.

Referring to FIG. 4, a system 1000 is depicted for generating a payment instrument having indicia that replaces at least a portion of the personal information with a randomized number, in accordance with embodiments of the present invention. System 1000 is deployed in a distributed computing environment and, as such implements network 200, which may comprise the Internet and/or an intranet. As previously discussed in relation to other embodiments, the system 1000 includes a random number-generator application 300 this is configured to generate the random number 310. In specific embodiments of the invention in which the payment instrument is generated dynamically, the random number 310 may be generated dynamically at the request of a payor or the like. While in other embodiments of the invention in which the payment instrument(s) are generated in advance (e.g., generating a set/series of personal checks), the random number 310 may be generated by the system 1000 at any point prior to generating the payment instrument(s).

System 1100 additionally includes linking application 400 that is configured to link or otherwise associate the random number 310 with the payment instrument 410, the payor 420 of the payment instrument 410 and, optionally, the payee 430 of the payment instrument 410. As previously discussed, the linking application 400 may be configured to automatically link the random number to the payment instrument(s) (e.g., when generating a series/set of personal checks or the like) and, in response to receiving identifying information of the payor, link the random number to the payor. In this regard, the random number may be linked to the payor, when generating a series/set of payment instruments, well in advance of providing the payment instrument or the random number may be generated and linked dynamically and/or on-demand just prior to generating the payment instrument and/or conducting the payment transaction.

In optional embodiments of the invention, the linking application 400 is further configured to link the random number 310 to payment/transaction parameters, such as, but not limited to, the payment/transaction amount 440 or payment limit, the volume/number of payments/transactions 450 (e.g., the number of payment instruments to be generated), the time period for conducting the payment transaction 460 or any other payment transaction parameter/variable 470. The linked payment/transaction parameters may be predetermined by the linking application (e.g., the entity/financial institution making the payment) or the mobile device user may dynamically define the linked payment/transaction parameters. For example, the linking application 400 may be configured to allow for a 90 day period of time 440 for conducting the transaction (e.g., depositing/cashing the personal check); however, the application 400 may be further configured to allow the user to override the predetermined period of time 440 and input a user-defined period of time, such as, minimal time for a Point-Of-Sale (POS) transaction, twenty-four (24) hours, seven days or the like.

The system 1000 additionally includes payment instrument generator application 700 that is configured to generate the payment instrument 410 (e.g., the personal check, credit/debit card or the like) including indicia that includes the random number 310. In specific embodiments, the random number replaces at least a portion of personal information associated with the payor. For example, in those embodiments in which the payment instrument 410 is a personal check, as shown and described in FIGS. 5 and 6, infra, the random number may replace all or a portion of the routing number, the account number or the check number.

Referring to FIGS. 5 and 6 shown are examples of payment instruments, specifically checks 1110 that replace at least a portion of the personal information with a random number, otherwise referred to as a token, key, PIN or the like. Specifically, in FIG. 5, the check number fields 1130 have been replaced with a random number, as indicated by the designation "ZZZZ". However, the routing number field 1110 and the account number filed 1120 have not been replaced and indicate the routing number and the account number, as indicated by the respective designations "XXXXXXXXX" and "XXXXXXXXXXXX". By replacing the check number with a random number less likelihood exists of a wrongdoer copying the check and inserting a following sequential check number that would appear to be a valid check. In FIG. 6, the routing number field 1110, the account number field 1120 and the check number field 1130 have all been replaced by the random number (or random numbers), as indicated by the respective designations "ZZZZZZZZZ," "ZZZZZZZZZZZZ" and "ZZZZ". By replacing the routing number, the account number and the check number with the random number, not only is the likelihood of unauthorized duplication further lessened, but also less personal information is made public (i.e., the payor's account number and financial institution are not divulged).

Thus, systems, apparatus, methods, and computer program products described above provide for authenticating recipients of a physical item based on generating a random number and linking the random number to the physical item and the intended recipient. Once the intended recipient is in possession of the physical item and the generated random number, the intended recipient is authorized for the purpose of using/processing the physical item by presenting the random number for recipient authentication. Such authentication insures that the user/processor of the physical item is the intended user/recipient. In specific embodiments of the invention, the physical item is a payment instrument. In other specific embodiments of the invention, the physical item is generated with the random number included in place of personal information associated with the provider. Such configuration limits the unnecessary dissemination of personal information and lessens the likelihood of unauthorized duplication of the physical item.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating a recipient of a physical item, the system comprising:
   a mobile device including a memory and one or more processors in communication with the memory;
   a mobile application stored in the memory, executable by the one or more processors and including:
      a random number generator configured to generate a random number;
      a linking application configured to:
         link the random number with a physical item, a presenter of the physical item, a recipient of the physical item, and a period of time for conducting an event using the physical item, and
         store the random number and a physical item identifier, a presenter identifier, a recipient identifier and a period of time identifier in an authentication database; and
      a physical item-generator configured to generate the physical item that includes the random number in place of information associated with the presenter,
      wherein (i) generating the random number, (ii) linking the random number with the physical item, the presenter, the recipient and the period of time, and (iii) generating the physical item are all conducted in unison in response to receiving an input request via the mobile application; and
   an authentication module stored in second memory, executable by one or more second processors and configured to:
      in response to receiving (i) an input of a number and (ii) an a recipient identifier from the recipient or a source associated with the recipient, access the authentication database to compare (i) the inputted number to the random number, and (ii) the inputted recipient identifier to the stored recipient identifier, and
      in response to determining a match between the inputted number and the random number and between the inputted recipient identifier and the stored recipient identifier, authenticate the recipient.

2. The system of claim 1, further comprising a processing module stored in third memory, executable by one or more third processors and configured to, in response to authenticating the recipient, process the physical item.

3. The system of claim 2, wherein the linking application is further configured to link the random number to at least one of a quantity of processing transactions, and a processing transaction limit.

4. The system of claim 3 wherein the processing module is further configured to verify, prior to processing the physical item, based on the random number, at least one of (i) the processing of the physical item is within the linked quantity of processing transactions, and (ii) the processing of the physical item is within the processing transaction limit.

5. The system of claim 1, wherein the physical item is further defined as a payment instrument.

6. The system of claim 1, wherein the payment instrument is one of a personal check or a credit card.

7. The system of claim 6, wherein the payment instrument is a series of personal checks, each of the personal checks designated for payment to the receiver.

8. The system of claim 1, wherein the physical-item generator application is further defined as a check-generator application configured to generate a personal check that includes the random number in place of at least a portion of one or more of a routing number, an account number and a check number.

9. The system of claim 8, wherein the check-generator application is further configured to generate the personal check that includes the random number in place of a routing number, an account number and a check number.

10. The system of claim 9, wherein the linking application is further configured to link the random number to the routing number, the account number and the check number.

11. The system of claim 8, wherein the check-generator application is further configured to generate the personal check that includes no personal identifying information associated with a holder of the account associated with the personal check.

12. The system of claim 2, wherein the processing module is further defined as a transaction module configured to, in response to authenticating the recipient, conduct a payment transaction in which the presenter is a payor and the recipient is a payee.

13. A system for authenticating a payee during a transaction, the system comprising:
   a mobile device including a memory and one or more processors in communication with the memory;
   a mobile application stored in the memory, executable by the one or more processors and including:
      a random number generator configured to generate a random number;
      a linking application configured to:
         link the random number with a physical payment instrument, a payor, a payee, and a period of time for conducting a transaction using the physical payment instrument, and store the random number and a payment instrument identifier, a payor identifier, a payee identifier and a period of time identifier in an authentication database;

a payment instrument-generator configured to generate a payment instrument that includes the random number in place of at least a portion of at least one of a routing number, an account number and a check number, wherein (i) generating the random number, (ii) linking the random number with the physical payment instrument, the payor, the payee and the period of time, and (iii) generating the physical payment instrument are all conducted in unison in response to receiving an input request via the mobile application; and an authentication module stored in second memory, executable by one or more second processors and configured to:

in response to receiving an input of (i) a number and (ii) a payee identifier from the payee or a payee source, access the authentication database to compare (i) the inputted number to the random number, and (ii) the inputted payee identifier to the stored payee identifier, and in response to determining a match between the inputted number and the random number and between the inputted payee identifier and the stored payee identifier, authenticate the payee.

* * * * *